_(12)_ United States Patent
Choi et al.

(10) Patent No.: US 9,265,027 B2
(45) Date of Patent: Feb. 16, 2016

(54) MULTI-CELL COMMUNICATION SYSTEM THAT PERFORMS INTERFERENCE CONTROL USING RELAY OF TERMINAL

(75) Inventors: Hyun Ho Choi, Yongin-si (KR); Hyo Sun Hwang, Yongin-si (KR); Young Jun Hong, Yongin-si (KR); Jong Bu Lim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 357 days.

(21) Appl. No.: 13/334,357

(22) Filed: Dec. 22, 2011

(65) Prior Publication Data

US 2012/0093043 A1 Apr. 19, 2012

Related U.S. Application Data

(63) Continuation of application No. PCT/KR2010/004147, filed on Jun. 25, 2010.

(30) Foreign Application Priority Data

Jun. 25, 2009 (KR) .................. 10-2009-0056917

(51) Int. Cl.
*H04L 5/14* (2006.01)
*G01R 31/08* (2006.01)
(Continued)

(52) U.S. Cl.
CPC ............ *H04W 72/00* (2013.01); *H04J 11/0026* (2013.01); *H04J 11/0053* (2013.01); *H04J 11/0056* (2013.01); *H04W 74/0833* (2013.01)

(58) Field of Classification Search
CPC ...... H04L 5/14; H04J 11/0053; H04J 11/005; H04J 11/0056; H04J 11/0026

USPC .......................................................... 370/280
See application file for complete search history.

(56) References Cited

U.S. PATENT DOCUMENTS 8,229,451 B2 * 7/2012 Frenger ............. H04W 72/1231
455/452.2
8,238,954 B2 * 8/2012 Liu et al. ...................... 455/501
(Continued)

FOREIGN PATENT DOCUMENTS

CN 101116365 A 1/2008
JP 2009-506652 A 2/2009
(Continued)

OTHER PUBLICATIONS

Chinese Office Action mailed Feb. 28, 2014 in counterpart Chinese Application No. 201080028421.5 (18 pages, in Chinese, with complete English transalation).
(Continued)

*Primary Examiner* — Faruk Hamza
*Assistant Examiner* — Abu-Sayeed Haque
(74) *Attorney, Agent, or Firm* — NSIP Law

(57) ABSTRACT

A multi-cell communication system comprises at least a first base station and first terminal and a second base station and second terminal. When the first and second base stations need to perform interference control, the first terminal may relay a message related to the interference control between the first base station and the second base station. That is, the first terminal may transfer a message related to the interference control from the first base station to the second base station, and a message related to the interference control from the second base station to the first base station. As such, the first base station and the second base station can transmit/receive messages that are for performing interference control via the first terminal.

26 Claims, 14 Drawing Sheets

(51) Int. Cl.
*H04B 7/00* (2006.01)
*H04W 72/00* (2009.01)
*H04J 11/00* (2006.01)
*H04W 74/08* (2009.01)

(56) References Cited

U.S. PATENT DOCUMENTS

| | | | | |
|---|---|---|---|---|
| 8,325,621 | B2* | 12/2012 | Simonsson | H04W 52/40 370/252 |
| 8,670,777 | B2* | 3/2014 | Borran | H04W 72/082 455/420 |
| 2007/0115890 | A1 | 5/2007 | Yi et al. | |
| 2009/0069043 | A1* | 3/2009 | Roh | H04W 52/42 455/522 |
| 2009/0109939 | A1* | 4/2009 | Bhushan | H04W 72/082 370/337 |
| 2009/0197588 | A1* | 8/2009 | Khandekar | H04W 72/082 455/422.1 |
| 2009/0291640 | A1* | 11/2009 | Bhattad | H04W 72/0406 455/63.1 |
| 2009/0291692 | A1* | 11/2009 | Kazmi | H04W 16/04 455/452.2 |
| 2010/0099428 | A1* | 4/2010 | Bhushan | H04J 11/0059 455/452.1 |
| 2011/0263271 | A1* | 10/2011 | Hoymann | H04B 7/024 455/456.1 |

FOREIGN PATENT DOCUMENTS

| | | |
|---|---|---|
| KR | 10-2006-0007396 | 1/2006 |
| KR | 10-2006-0074795 A | 7/2006 |
| WO | WO 2006-093385 A2 | 9/2006 |
| WO | WO 2009/035983 A1 | 3/2009 |
| WO | WO 2009-065075 A1 | 5/2009 |

OTHER PUBLICATIONS

International Search Report issued Jan. 25, 2011, in counterpart international application No. PCT/KR2010/004147 pp. 1-4.
Japanese Office Action mailed May 13, 2014 in counterpart Japanese Application No. 2012-5173963 (11 pages, in Japanese, with complete English translation of the substantive portion).
Chinese Office Action issued Oct. 20, 2014 in counterpart Chinese Application No. 201080028421.5 (27 pages, with English transalation).

* cited by examiner

DOWNLINK CASE

UPLINK CASE

MULTI-CELL COMMUNICATION SYSTEM THAT PERFORMS INTERFERENCE CONTROL USING RELAY OF TERMINAL

CROSS-REFERENCE TO RELATED APPLICATION(S)

This application is a continuation of International Patent Application No. PCT/KR2010/004147, filed on Jun. 25, 2010, which claims the benefit of Korean Patent Application No. 10-2009-0056917, filed on Jun. 25, 2009, the benefit of U.S. patent application Ser. No. 12/715,436, filed on Mar. 2, 2010, and the benefit of International Patent Application No. PCT/KR2010/001903, filed on Mar. 29, 2010, to the entire disclosures of which are incorporated herein by reference for all purposes.

BACKGROUND

1. Field

The following description relates to technologies that may overcome adverse effects resulting from interference occurring between cells.

2. Description of Related Art

Recently, interests in a multi-cell communication system have increased. For example, a multi-cell communication system may include at least two macro cells, and may include a macro cell and a small-sized cell including a small base station, for example, a femto base station, a pico base station, and the like.

Generally, terminals included in a coverage area of the femtocell may be more efficiently served by the femto base station that is positioned at an adjacent location, and thus, it is possible to improve a transmission rate. When the macro cell includes a portion of or the entire femtocell, interference may occur between the macro cell and the femtocell. The interference may cause adverse effects to both the macro cell and the femtocell.

Attempts to resolve these adverse effects resulting from the interference between the macro cell and the femtocell gives rise to complicated issues. In particular, technologies for interference control are in development to overcome the above adverse effects. The technologies may be embodied into various types, for example, an optimal resource scheduling, a transmit power control such as a dynamic spectrum management, an interference alignment, an interference treated as noise (ITN), an interference neutralization, a multi-antenna transmit, and the like.

SUMMARY

In one general aspect, there is provided a communication method of a first terminal served by a first base station, the communication method including generating a message for controlling interference caused by a second base station adjacent to the first base station and/or interference caused by a second terminal served by the second base station, and transmitting the message to the second base station so that the second base station controls the interference, or so that the first base station and the second base station cooperate to control the interference.

The communication method may further comprise transmitting channel information of the first terminal to the first base station, and receiving, from the first base station, information indicating that interference is occurring in the first terminal, wherein the transmitting of the message comprises transmitting the message to the second base station, in response to the received information indicating that the interference is occurring in the first terminal.

The communication method may further comprise relaying a result of the interference control or a response to the message between the first base station and the second base station.

The communication method may further comprise receiving information associated with a request for the interference control from the second base station, and transmitting information associated with the request for the interference control to the first base station, wherein the generating comprises generating the message for controlling the interference based on a response of the first base station about information associated with the request for the interference control.

The communication method may further comprise measuring the interference from the second base station to the first terminal or the interference from the second terminal to the first terminal, based on channel information of the first terminal, wherein the transmitting of the message comprises transmitting the message to the second base station based on the interference from the second base station to the first terminal or the interference from the second terminal to the first terminal.

The first base station may be a macro base station in a cellular communication system, and the second base station may be a smaller base station that comprises a femto base station or a pico base station.

The generating may comprise generating a feedback message that is used when the second base station verifies channel information between the first base station and the first terminal and channel information between the second base station and the first terminal, or channel information between the first base station and the first terminal and channel information between the first base station and the second terminal.

The transmitting may comprise transmitting the message to the second base station using a common shared channel or a random access channel.

The generating may comprise generating the message by combining channel information between the first base station and the first terminal with a well-known signal.

The generating may comprise generating the message by processing channel information between the first base station and the first terminal as a reference signal.

The communication method may further comprise recognizing the interference from the second base station to the first terminal or the interference from the second terminal to the first terminal, wherein the generating comprises generating the message based on the recognized interference, or the transmitting comprises transmitting the message based on the recognized interference.

The recognizing of the interference from the second base station to the first terminal may comprise recognizing the interference based on at least one of a signal-to-interference plus noise ratio (SINR) with respect to a signal received from the first base station, a packet error rate, a bit error rate, a received signal strength, a reference signal received power, and a reference signal received quality.

The recognizing of the interference from the second base station to the first terminal or the interference from the second terminal to the first terminal may comprise recognizing the interference from the second base station to the first terminal or the interference from the second terminal to the first terminal based on the interference from the second base station to the first terminal or the interference from the second terminal to the first terminal in comparison to a predetermined level.

The first base station, the first terminal, and the second base station may operate using a time division duple (TDD) scheme.

In another aspect, there is provided a communication method of a second base station that serves a second terminal and which is adjacent to a first base station serving a first terminal, the communication method including receiving, from the first terminal, a message for controlling interference with respect to interference from the second base station to the first terminal or interference from the second terminal to the first terminal, determining whether the interference control is to be controlled based on the message, and controlling the interference based on the determination result.

The communication method may further comprise transmitting information associated with a request for the interference control to the first terminal, in response to the interference from the second base station to the first terminal or the interference from the second terminal to the first terminal being predicted to occur, wherein the receiving comprises receiving the message for controlling the interference from the first terminal after transmitting information associated with the request for the interference control to the first terminal.

The determining may comprise verifying a requirement of the first base station in relation to the interference control based on the message, and the controlling comprises controlling the interference based on the requirement of the first base station in relation to the interference control.

The communication method may further comprise verifying channel information between the first base station and the first terminal and channel information between the second base station and the first terminal or channel information between the first base station and the second terminal, wherein the controlling comprises controlling the interference based on channel information between the first base station and the first terminal and channel information between the second base station and the first terminal or channel information between the first base station and the second terminal.

The receiving may comprise receiving the message for controlling the interference from the first terminal using a common shared channel or a random access channel.

The message may comprise a reference signal, and the reference signal may be generated by processing channel information between the first base station and the first terminal.

In another aspect, there is provided a communication method of a first base station in a multi-cell communication system comprising the first base station serving a first terminal and a second base station serving a second terminal, the communication method including measuring interference from the second terminal to the first base station or interference from the second base station to the first base station, and requesting the first terminal to generate a message for controlling interference, and to transfer the message to the second base station.

The communication method may further comprise independently controlling the interference or cooperatively controlling the interference through coordination with the second base station, with respect to the interference from the first terminal to the first base station or the interference from the second base station to the first base station.

The communication method may further comprise receiving a response to the message from the second base station via the first terminal, or transmitting a result of the interference control to the second base station via the first terminal.

In another aspect, there is provided a terminal served by a serving base station, the terminal including a message generator configured to generate a message that comprises information that enables a neighboring base station to verify channel information between the serving base station and the terminal, and channel information between the neighboring base station and the terminal, and a transmitter configured to transmit the message to the neighboring base station.

The terminal may further comprise a channel measurement unit configured to measure channel information between the serving base station and the terminal, wherein the transmitter is configured to transmit the channel information to the serving base station.

The terminal may further comprise a receiver configured to receive interference information from the serving base station, wherein the message generator is configured to generate the message based on the interference information received from the serving base station.

Other features and aspects may be apparent from the following detailed description, the drawings, and the claims.

Figure 1:
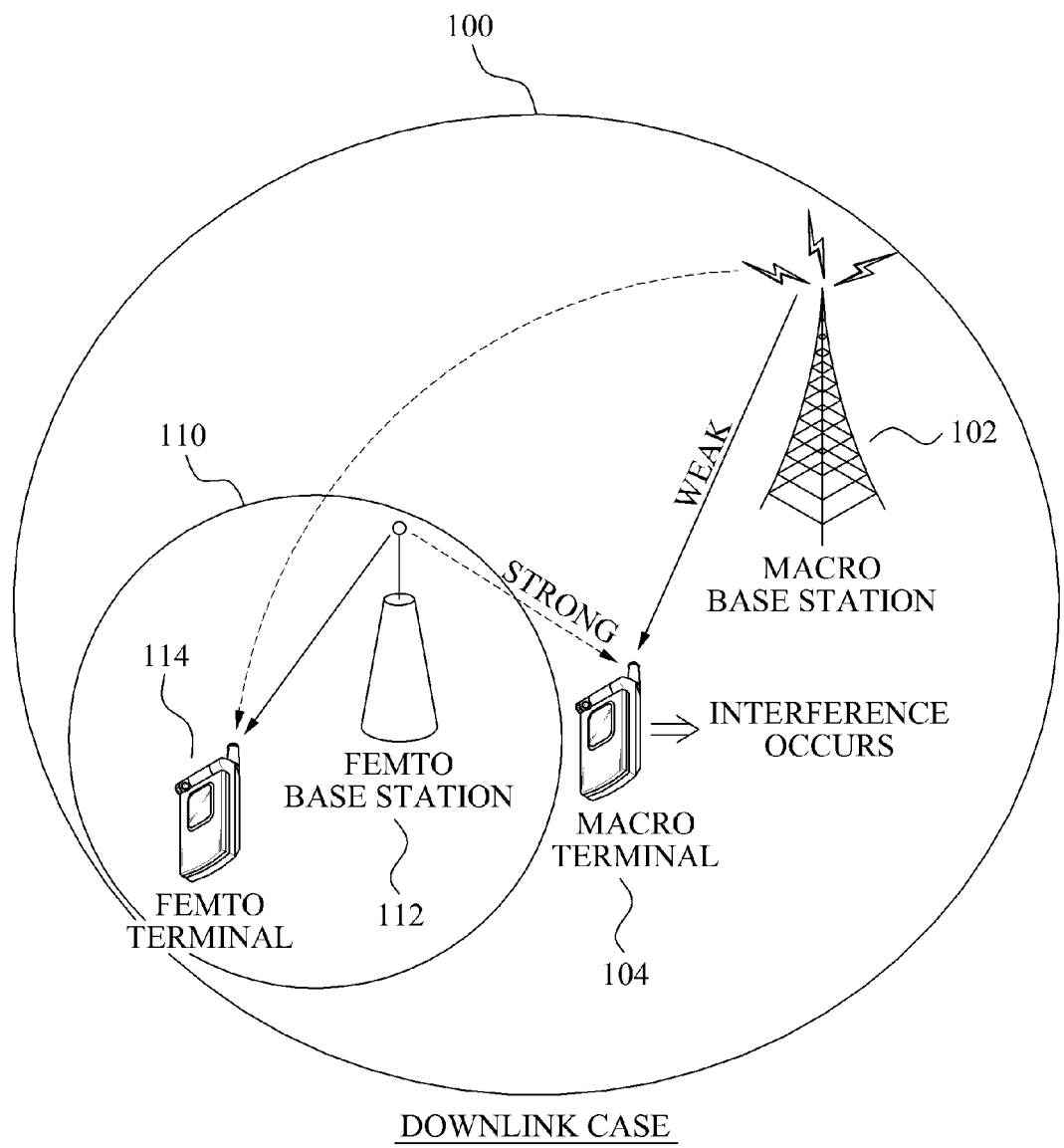
FIG. 1 is a diagram illustrating an example of interference occurring in a macro terminal due to a femto base station in a downlink.

Throughout the drawings and the detailed description, unless otherwise described, the same drawing reference numerals will be understood to refer to the same elements, features, and structures. The relative size and depiction of these elements may be exaggerated for clarity, illustration, and convenience

DETAILED DESCRIPTION

The following detailed description is provided to assist the reader in gaining a to comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

For example, the term "base station" used herein may include a general base station of a cellular base station and various types of devices. The "base station" may include devices that serve various types of receivers such as terminals. The term "terminal" used herein may include a mobile device, for example, a cellular phone, a notebook, a smart phone, a tablet, a computer, a television, and the like, and may also include various types of devices to receive a data signal from the base station or a relay.

The term "femto base station" used herein may be an example of a small base station such as a pico base station as well as the femto base station.

FIG. 1 illustrates an example of interference occurring in an example of a macro terminal due to a femto base station in a downlink.

Referring to FIG. 1, a coverage 100 area of a macro cell includes a coverage area 110 of a femtocell. In this example, the macro cell is operated by a macro base station and the femtocell is operated by the femto base station.

In the case of a downlink, the macro base station may transmit a signal to the macro terminal, and the femto base station may transmit a signal to the femto terminal. The macro terminal denotes a terminal that is served by the macro terminal and femto terminal denotes a terminal that is served by the femto base station. Each of the macro base station and the femto base station may transmit a signal using the same radio resource.

In this example in which the macro base station and the femto base station use the same radio resource, interference may occur between the macro cell and the femtocell. For example, as shown in FIG. 1, if the macro terminal is adjacent to the coverage area 110 of the femtocell, the femto base station may cause a significant amount of interferences in the macro terminal.

In FIG. 1, a solid line indicates a desired signal transmitted from the macro base station to the macro terminal, and a dotted line indicates an interference signal transmitted from the femto base station to the macro terminal. If a strength of the interference signal is great, the macro terminal may not appropriately receive the desired signal from the macro base station.

Figure 2:
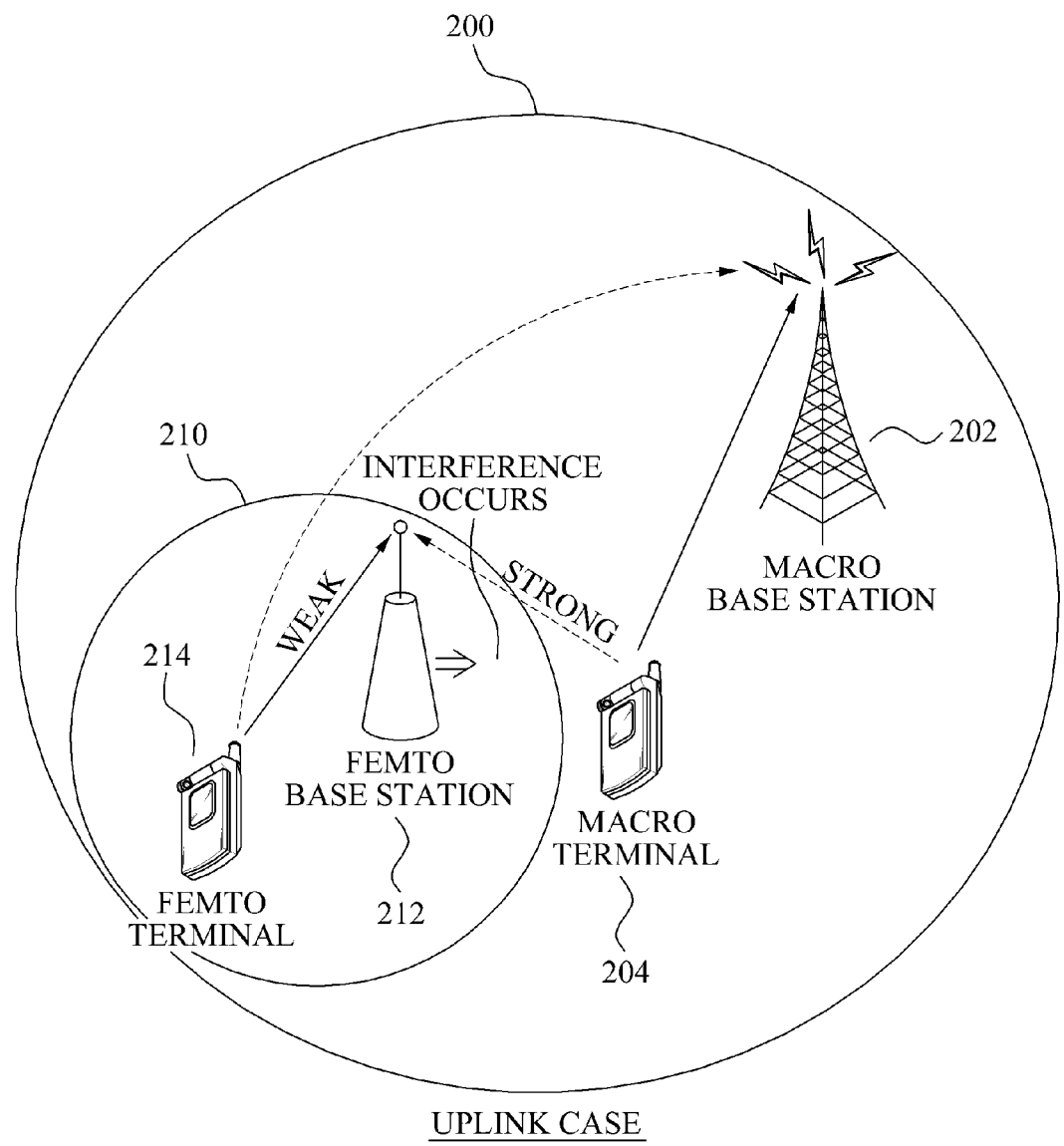
FIG. 2 is a diagram illustrating an example of interference occurring in a femto base station due to a macro terminal in an uplink.

FIG. 2 illustrates an example of interference occurring in a femto base station due to a macro terminal in an uplink.

Referring to FIG. 2, a coverage area 200 of a macro cell includes a coverage area 210 of a femtocell.

In the uplink, the macro terminal may transmit a signal to a macro base station, and a femto terminal may transmit a signal to the femto base station. In an example in which the macro terminal and the femto terminal use the same radio resource, interference may occur in the femto base station due to the macro terminal. For example, as shown in FIG. 2, if the macro terminal is adjacent to the coverage area 210 of the femtocell, the macro terminal may cause a significant amount of interferences in the femto base station.

In FIG. 2, a solid line indicates a desired signal transmitted from the femto terminal to the femto base station, and a dotted line indicates an interference signal that is transmitted from the macro terminal to the femto base station. If a strength of the interference signal is great, the femto base station may not appropriately receive the desired signal from the femto terminal.

As shown in FIGS. 1 and 2, when interference occurs in the macro terminal or the femto base station, the femto base station or the macro base station may perform an interference control. For example, the femto base station or the macro base station may perform an optimal resource scheduling, a transmit power control such as a dynamic spectrum management, an interference alignment, an interference treated as noise (ITN), interference neutralization, a multi-antenna transmit, and the like. Also, the interference control may be performed by all of the femto base station and the macro base station through coordination, or may be independently performed by the femto base station and/or the macro base station. For example, if the interference control is performed independently by the macro base station, a result of the interference control performed by the macro base station may be notified to the femto base station. In this example, the femto base station may operate based on the result of the interference control.

Because the femtocell and the macro cell are independent from each other, it to may be difficult to directly control interference. For example, the femto base station may need to verify information regarding various channels in association with the macro terminal to perform the interference control. The verifying of the above information may cause great overhead.

Figure 3:
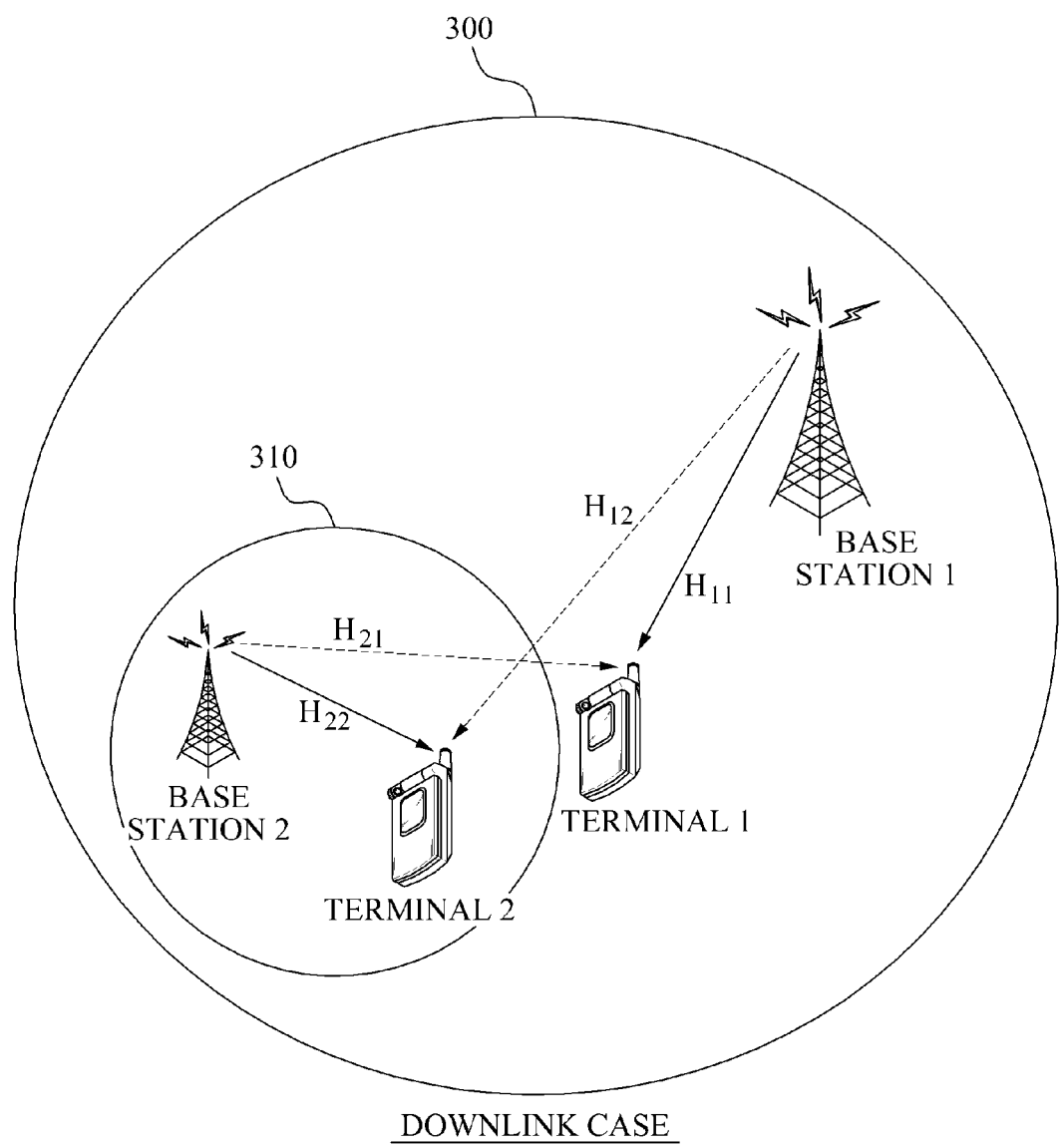
FIG. 3 is a diagram illustrating examples of channels between base stations and terminals in a downlink.

FIG. 3 illustrates examples of channels between base stations and terminals in a downlink.

Referring to FIG. 3, it is assumed that a channel between a base station 1 and a terminal 1 is $H_{11}$, a channel between the base station 1 and a terminal 2 is $H_{12}$, a channel between a base station 2 and the terminal 1 is $H_{21}$, and a channel between the base station 2 and the terminal 2 is $H_{22}$. In association with the terminal 1, the channel $H_{11}$ indicates a channel corresponding to a desired signal, and the channel $H_{21}$ indicates an inference channel corresponding to an interference signal.

To cope with adverse effects resulting from interference occurring in the terminal 1, the base station 2 may perform interference control such as a dynamic spectrum management. In this example, the base station 2 may need to verify the channels $H_{11}$ and $H_{21}$.

An example in which the base station 2 verifies the channels $H_{11}$ and $H_{21}$ is described with reference to FIG. 4.

Figure 4:
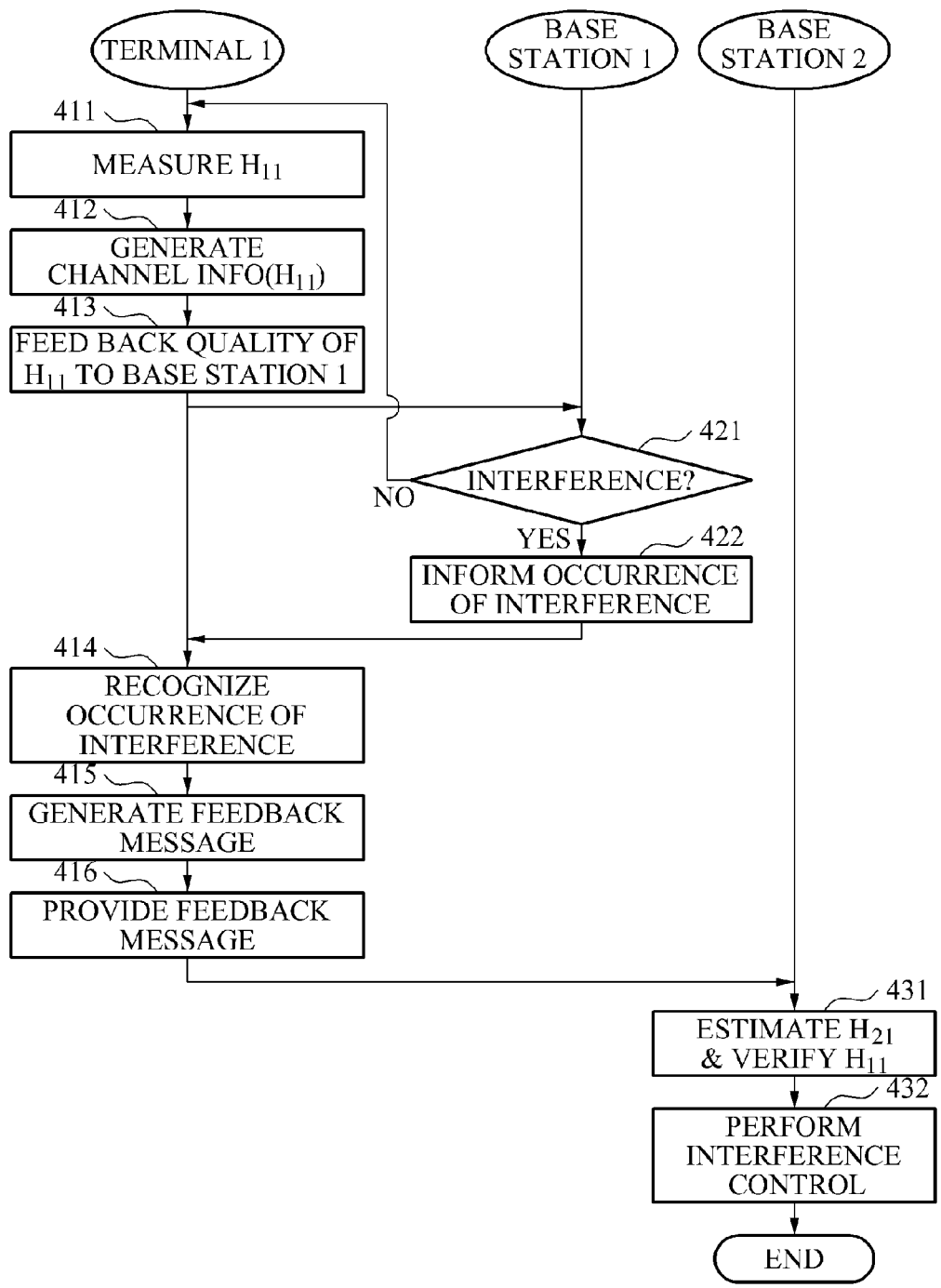
FIG. 4 is a flowchart illustrating an example of a method of operating a terminal 1, a base station 1, and a base station 2 of FIG. 3.

FIG. 4 illustrates an example of a method of operating the terminal 1, the base station 1 and the base station 2 of FIG. 3.

Referring to FIG. 1, in 411, the terminal 1 measures the channel $H_{11}$ between the base station 1 and the terminal 1. For example, the terminal 1 may periodically or aperiodically measure the channel $H_{11}$ using a pilot signal that is transmitted from the base station 1.

In 412, the terminal 1 generates channel information associated with the channel $H_{11}$, based on the measured channel $H_{11}$ between the base station 1 and the terminal 1. For example, the channel information associated with the channel $H_{11}$ may include channel quality information such as a signal-to-interference plus noise ratio (SINR) with respect to the channel $H_{11}$.

In 413, the terminal 1 feeds back channel information of the channel $H_{11}$ to the base station 1. For example, the terminal 1 may feed back the channel information of the channel $H_{11}$ to the base station 1 using a known channel quality information (CQI) feedback scheme.

In 421, the base station 1 determines whether interference exists in the terminal 1 based on the channel information of the channel $H_{11}$. In some embodiments, the terminal 1 may also determine whether the interference exists, instead of the base station.

For example, the base station 1 may determine whether the interference exists in the terminal 1 based on an SINR of the terminal 1, a packet error rate (PER), a bit error rate (BER), a received signal strength, a reference signal received power, a reference signal received quality, and the like. For example, the base station 1 may determine whether the interference exists by comparing the SINR, the PER, the BER, and the like with a particular level. In this example, if the SINR at the terminal 1 becomes smaller than the particular level, or if the PER or the BER becomes greater than the particular level, the base station 1 may determine the interference exists in the terminal 1.

If it is determined the interference does not exist in the terminal 1, the terminal 1 may repeat 411 through 413. Conversely, if it is determined the interference exists in the terminal 1, the base station 1 informs the terminal 1 about that the interference occurs in the terminal 1, in 422.

In 414, the terminal 1 recognizes the occurrence of the interference in response to the notice from the base station 1.

In 415, in response to the terminal 1 recognizing the occurrence of the interference, the terminal 1 generates a feedback message. For example, the feedback message may be used to inform the base station 2 about channel information associated with the channel $H_{11}$ between the base station 1 and the terminal 1, and channel information associated with the channel $H_{21}$ between the base station 2 and the terminal 1.

According to various examples, the base station 2 may verify, using only the feedback message, channel information associated with the channel $H_{11}$ between the base station 1 and the terminal 1, and channel information associated with the channel $H_{21}$ between the base station 2 and the terminal 1, an example of which is described with reference to FIGS. 7 and 8. The feedback message may be generated by various types of schemes as follows.

For example, the terminal 1 may generate the feedback message by combining a well-known signal, such as a preamble or a pilot signal, and channel information associated with the channel $H_{11}$ between the base station 1 and the terminal 1. In this example, the base station may need to verify channel information associated with the channel $H_{11}$ between the base station 1 and the terminal 1 that is included in the feedback message.

In response to receiving the feedback message, the base station 2 may estimate channel information associated with the channel $H_{21}$ between the base station 2 and the terminal 1 using the well-known signal such as the preamble or the pilot signal, included in the feedback message. For example, the base station 2 may estimate channel information associated with a channel from the base station 2 to the terminal 1, and may also estimate channel information associated with a channel from the terminal 1 to the base station 2, using the feedback message.

In a time division duplex (TDD) system, the channel from the base station 2 to the terminal 1 may be considered to be the same as the channel from the terminal 1 to the base station 2. Accordingly, the base station 2 may estimate channel information associated with the channel from the terminal 1 to the base station 2, instead of estimating the channel information associated with the channel from the terminal 1 to the base station 2.

As another example, the terminal 1 may generate the feedback message by processing channel information associated with the channel $H_{11}$ between the base station 1 and the terminal 1. In this example, the terminal 1 may process channel information associated with the channel $H_{11}$ between the base station 1 and the terminal 1 to a reference signal.

For example, the terminal 1 may process channel information associated with the channel $H_{11}$ between the base station 1 and the terminal 1 to an orthogonal reference signal such as a constant amplitude zero autocorrelation (CAZAC) sequence, based on an SINR of the channel $H_{11}$ between the base station 1 and the terminal 1, and a cell ID of the base station 1. The channel information associated with the channel $H_{11}$ between the base station 1 and the terminal 1 may map the orthogonal reference signal, based on a range of the SINR of the channel $H_{11}$ between the base station 1 and the terminal 1. In this example, the base station 2 may verify a pattern of received orthogonal reference signals to verify channel information that is associated with the channel $H_{11}$ between the base station 1 and the terminal 1. Also, the base station 2 may estimate channel information associated with the channel $H_{21}$ between the base station 2 and the terminal 1.

In addition to the aforementioned examples, the terminal 1 may generate the feedback message using various other types of schemes, so that the base station 2 may simultaneously verify channel information associated with the channel $H_{11}$ between the base station 1 and the terminal 1, and channel information associated with the channel $H_{21}$ between the base station 2 and the terminal 1.

In 416, the terminal 1 provides the generated feedback message to the base station 2. For example, the terminal 1 may use a common shared channel or a random access channel. If the terminal 1 uses the random access channel, the terminal 1 may process the feedback message to an orthogonal reference signal in preparation for a collision. An example in which the terminal 1 uses the common shared channel and the random access channel is described with reference to FIGS. 7 and 8.

In 431, the base station 2 simultaneously estimates channel information associated with the channel $H_{21}$ between the base station 2 and the terminal 1 based on the feedback message provided from the terminal 1, and verifies channel information associated with the channel $H_{11}$ between the base station 1 and the terminal 1.

In 432, the base station 2 performs an interference control using various types of schemes, for example, a dynamic spectrum management. The interference control may be performed based on channel information associated with the channel $H_{11}$ between the base station 1 and the terminal 1, and channel information associated with the channel $H_{21}$ between the base station 2 and the terminal 1.

The terminal 1 may effectively determine whether interference occurs, based on an SINR, a PER, a BER, and the like. Because the terminal 1 does not separately estimate a channel between the base station 2 and the terminal 1, the base station 1 and the base station 2 may have no need to use orthogonal pilots. Also, the base station 2 may simultaneously verify, using a single feedback message, channel information associated with the channel $H_{11}$ between the base station 1 and the terminal 1, and channel information associated with the channel $H_{21}$ between the base station 2 and the terminal 1. Accordingly, it is possible to reduce overhead.

Figure 5:
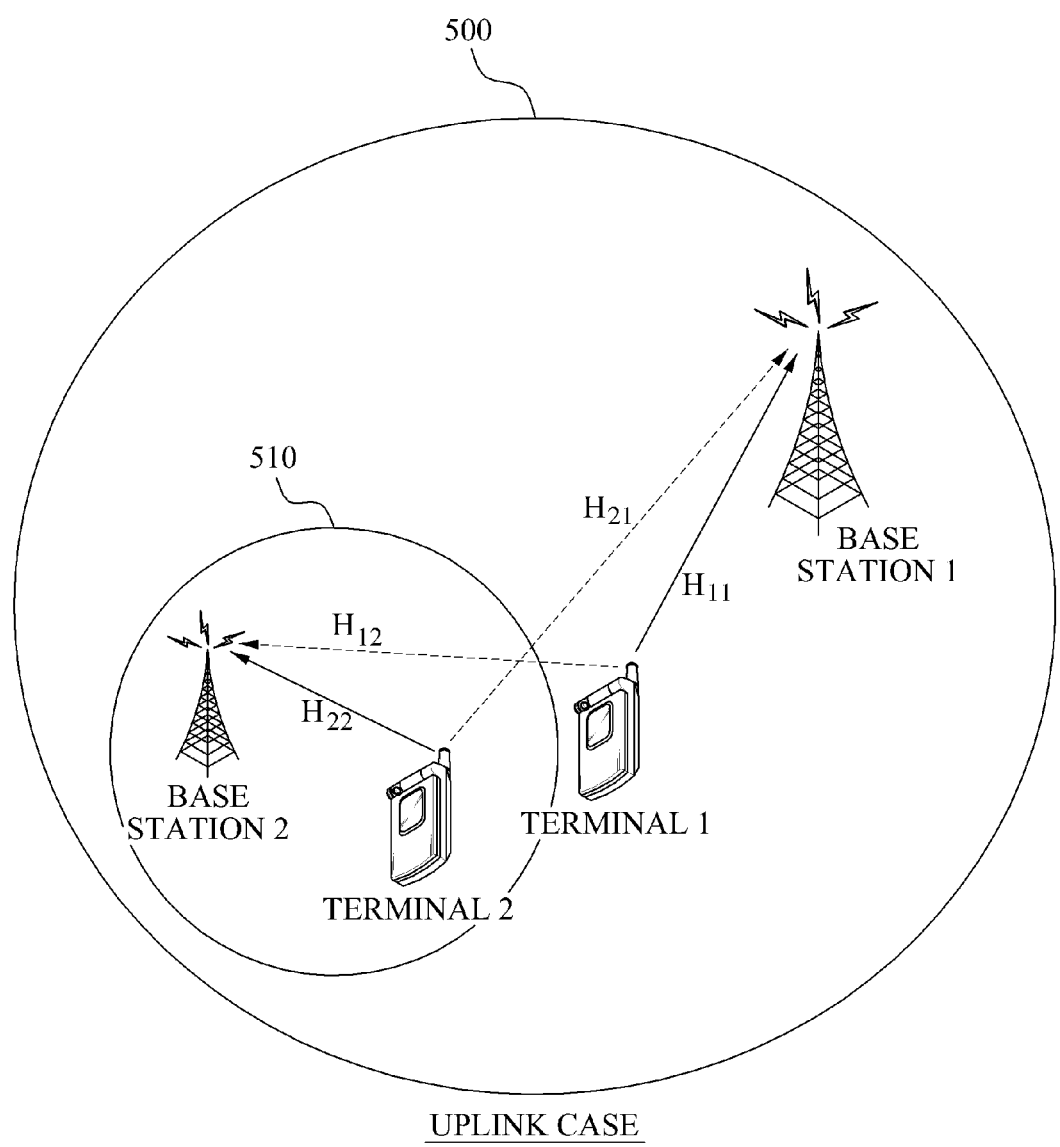
FIG. 5 is a diagram illustrating examples of channels between base stations and terminals in an uplink.

FIG. 5 illustrates examples of channels between base stations and terminals in an uplink. Referring to FIG. 5, a coverage area 500 of a macro cell includes a coverage area 510 of a femtocell.

In this example, it is assumed that a channel between a terminal 1 and a base station 1 is $H_{11}$, a channel between the terminal 1 and a base station 2 is $H_{12}$, a channel between a terminal 2 and the base station 1 is $H_{21}$, and a channel between the terminal 2 and the base station 2 is $H_{22}$. In association with the base station 2, the channel $H_{22}$ indicates a channel corresponding to a desired signal, and the channel $H_{12}$ indicates an interference channel corresponding to an interference signal.

To cope with adverse effects resulting from interference occurring in the base station 2, the base station 1 may perform an interference control such as a dynamic spectrum management. In this example, the base station 2 may need to verify the channels $H_{12}$ and $H_{22}$.

An example in which the base station 2 verifies the channels $H_{12}$ and $H_{22}$ is described with reference to FIG. 6.

Figure 6:
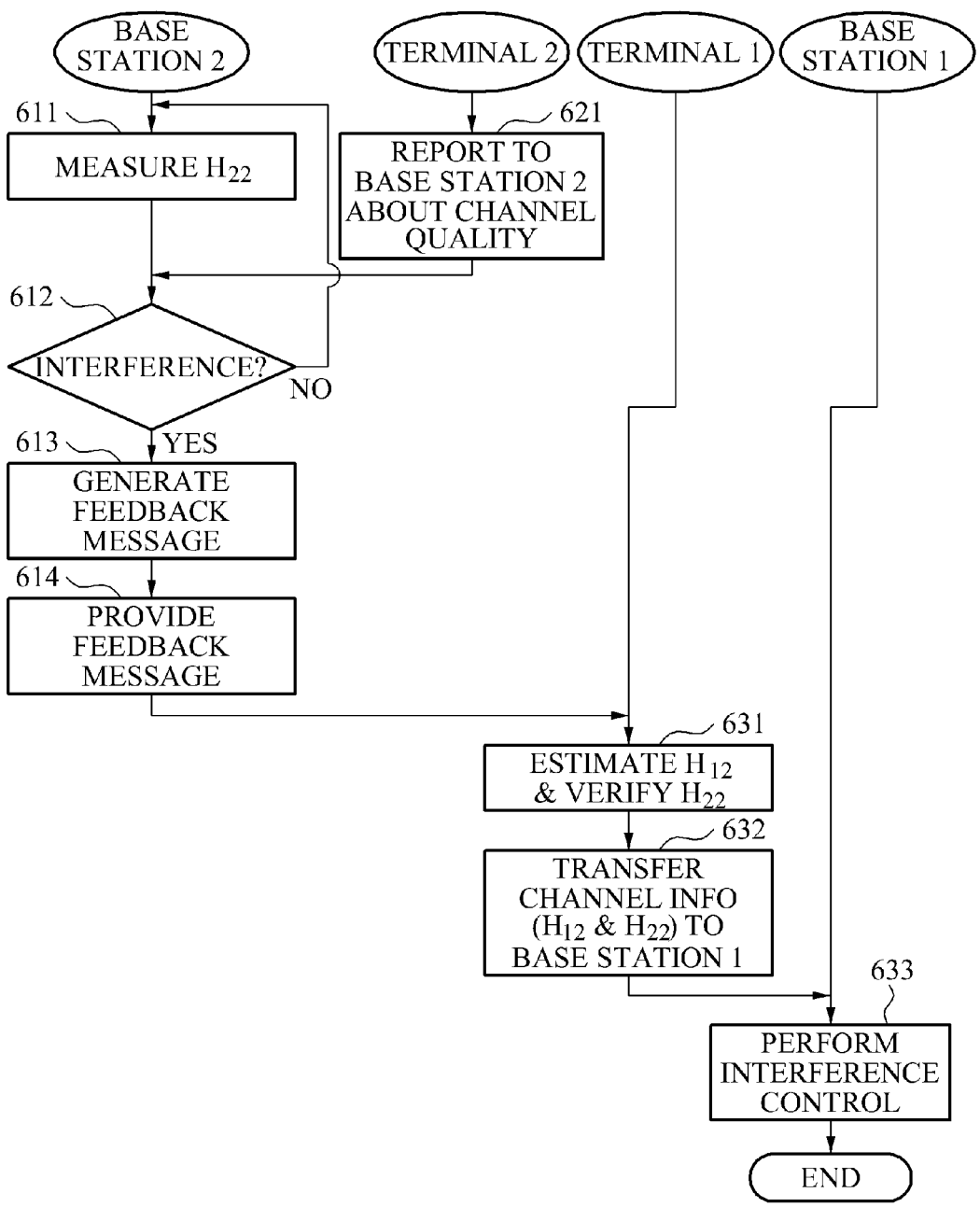
FIG. 6 is a flowchart illustrating an example of a method of operating a terminal 1, a terminal 2, a base station 1, and a base station 2 of FIG. 5.

FIG. 6 illustrates an example of a method of operating the terminal 1, the terminal 2, the base station 1, and the base station 2 of FIG. 5.

Referring to FIG. 6, in 611, the base station 2 measures the channel $H_{22}$ between the terminal 2 and the base station 2. For example, the base station 2 may measure the channel $H_{22}$ using a sounding packet transmitted from the terminal 2. Measuring the channel $H_{22}$ may include measuring a gain of the channel $H_{22}$ or an SINR of the channel $H_{22}$.

In 621, the terminal 2 reports to the base station 2 about the SINR of the terminal 2 in association with a quality of a using channel. For example, the terminal 2 may report to the base station 2 about the SINR of the terminal 2 using a well-known CQI feedback scheme.

In 612, the base station 2 determines whether interference exists in the base station 2, based on channel information associated with the measured channel $H_{22}$, for example, an SINR. For example, the base station 2 may determine whether the interference exists in the base station 2 based on an SINR of the base station 2, a PER, a BER, and the like.

If interference does not exist in the base station 2, the base station 2 may repeat to 611 and 612. Conversely, if interference exists, the base station 2 generates a feedback message in 613. The feedback message may be used by the terminal 1 to verify channel information between the base station 2 and the terminal 2, and channel information between the base station 2 and the terminal 1.

For example, the base station 2 may generate the feedback message by combining channel information associated with the channel $H_{22}$ and a well-known signal such as a pilot signal or a preamble. As another example, the base station 2 may generate the feedback message by processing channel information associated with channel $H_{22}$ to a reference signal such as a CAZAC sequence. It should be appreciated that the feedback message may be generated using various types of schemes.

In 614, the base station 2 provides the generated feedback message to the terminal 1 using a common shared channel or a random access channel.

In 631, the terminal 1 verifies channel information associated with the channel $H_{22}$ from the feedback message to estimate channel information associated with the channel $H_{12}$ using the feedback message. For example, the terminal 1 may verify channel information associated with the channel $H_{22}$ from the feedback message, and may estimate channel information associated with the channel $H_{12}$ using the pilot signal or the preamble included in the feedback message. The terminal 1 may simultaneously estimate channel information associated with the channel $H_{12}$ from the feedback message including the reference signal, and verify channel information associated with the channel $H_{22}$.

In 632, the terminal 1 transfers channel information associated with the channel $H_{12}$ and channel information associated with the channel $H_{22}$, to the base station 1.

Figure 7:
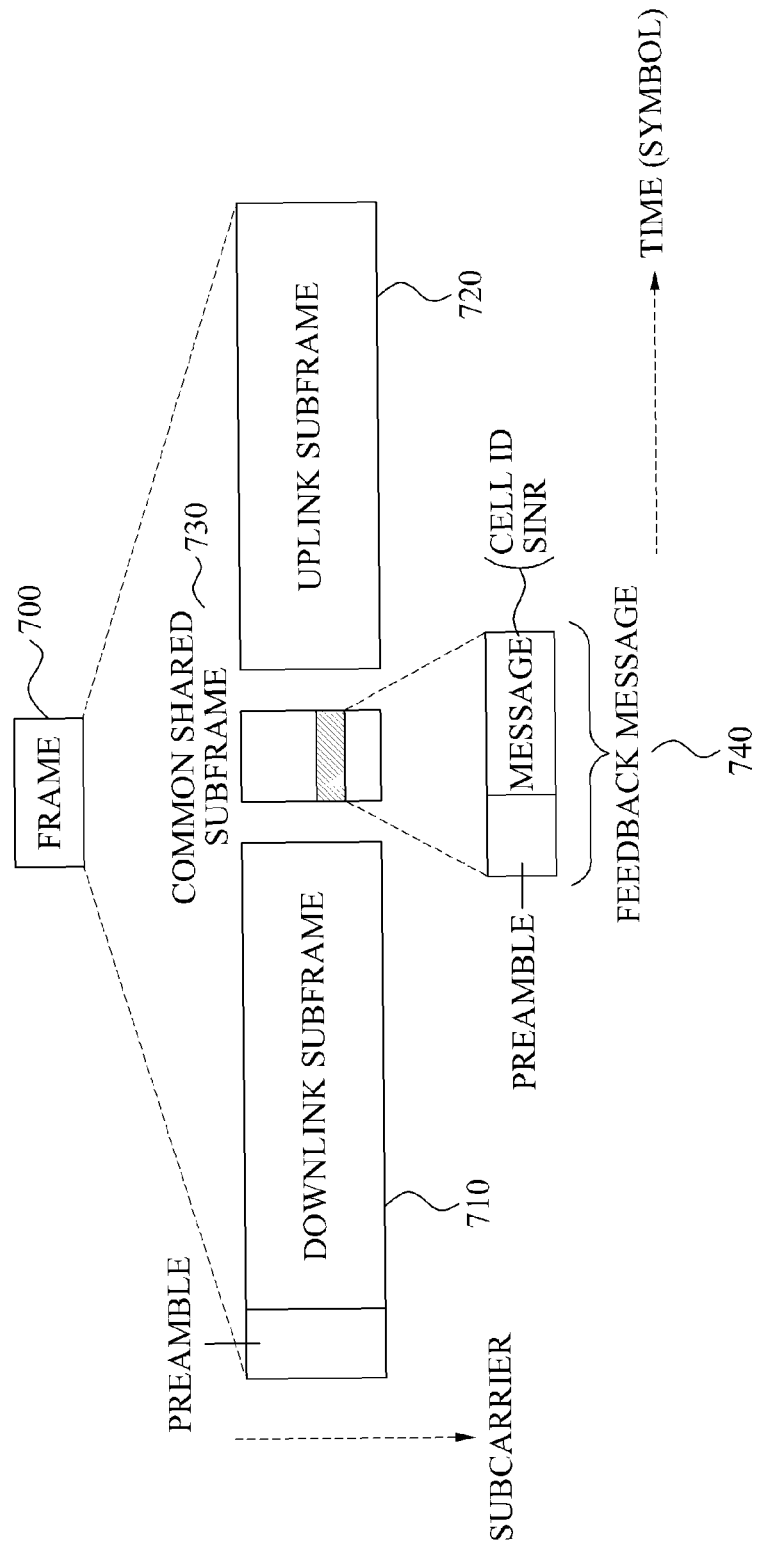
FIG. 7 is a diagram illustrating an example of a frame format.

FIG. 7 illustrates an example of a frame format.

Referring to FIG. 7, a common shared channel may be used for a feedback message. A common shared subframe indicates a subframe for the common shared channel.

In this example, the frame includes a downlink subframe, an uplink subframe, and the common shared subframe. The common shared subframe may be used by a terminal or a base station to transmit the feedback message.

For example, the terminal or the base station may generate the feedback message by inserting an SINR and an ID of a corresponding cell, into a "message" item, and by combining a "preamble" as a well-known signal and the "message" item. The terminal or the base station may transmit the feedback message using a portion of or the entire common shared subframe.

Figure 8:
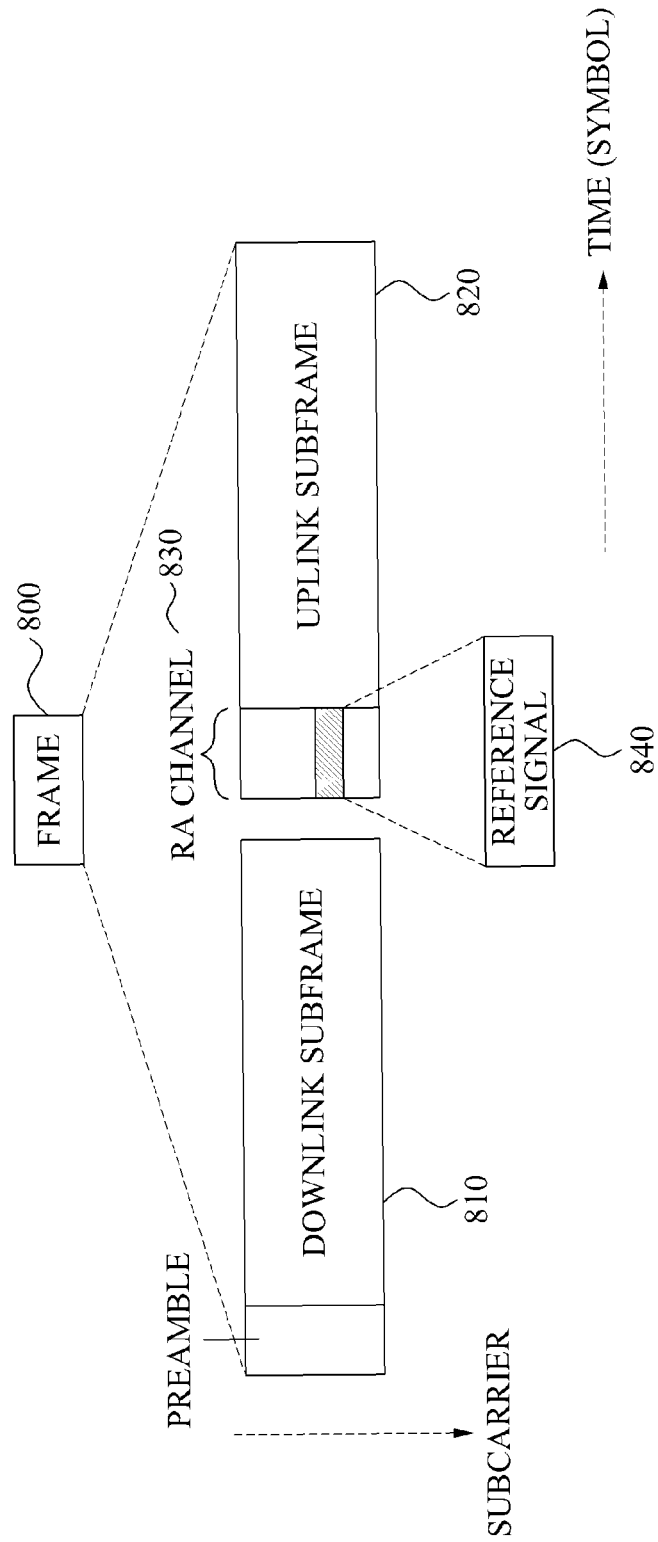
FIG. 8 is a diagram illustrating another example of a frame format.

FIG. 8 illustrates another example of a frame format.

Referring to FIG. 8, a random access channel may be used for a feedback message.

The entire frame includes a downlink subframe, an uplink subframe, and the random access channel. The random access channel may be used by various types of devices. For example, the random access channel may be used by the terminal or the base station to transmit the feedback message.

As described herein, it is assumed that the terminal or the base station generates a reference signal such as a CAZAC sequence based on channel information to be transferred, and a cell ID. Because the reference signal generated by the terminal or the base station is orthogonal to other reference signals generated by the other devices, the terminal or the base station may transfer the channel information without a collision.

A device receiving the reference signal may extract channel information corresponding to the reference signal, and may estimate, using the reference signal, channel information that is associated with a channel corresponding to a transmission path of the reference signal.

Description made above with reference to FIGS. 1 through 8 relates to examples in which the terminal 1 of FIG. 3 provides a feedback message to the base station 2 of FIG. 3, and an example in which the base station 2 of FIG. 5 provides a feedback message to the terminal 1 of FIG. 5. Examples in which the terminal 1 or the terminal 2 of FIG. 3 or FIG. 5 performs relaying while an interference control is being performed are further described.

Figure 9:
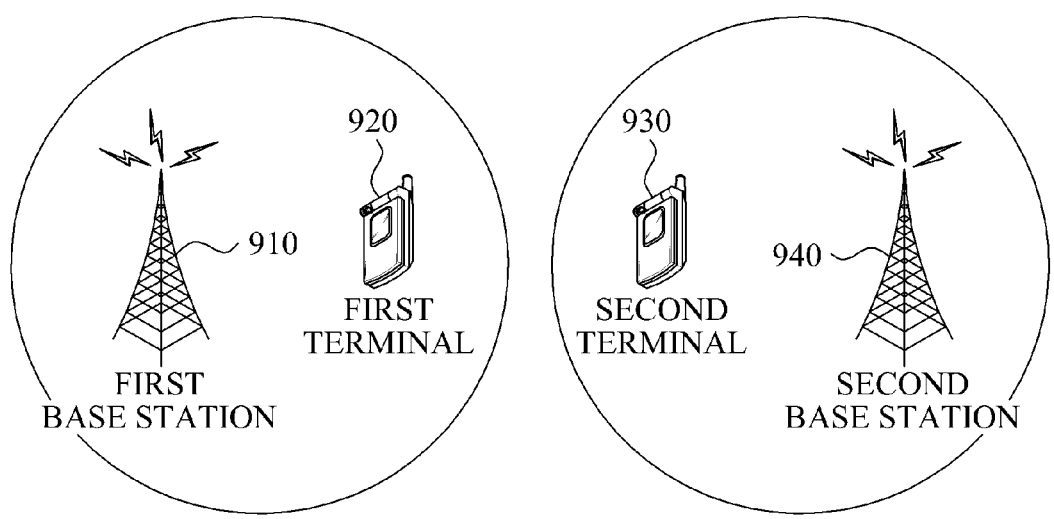
FIG. 9 is a diagram illustrating an example of a multi-cell communication system including a first base station, a first terminal, a second base station, and a second terminal.

FIG. 9 is a diagram illustrating an example of a multi-cell communication system including a first base station, a first terminal, a second base station, and a second terminal.

Referring to FIG. 9, the multi-cell communication system includes a first base station 910, a first terminal 920, a second terminal 930, and a second base station 940. The first base station 910 and the first terminal 920 are included in a single cell, and the second base station 940 and the second terminal 930 are included in another single cell. For example, the first terminal 920 may be served by the first base station 910 and the second terminal 930 may be served by the second base station 940. In FIG. 9, the relationship of the first base station 910 and the second base station 940 or of the second base station 940 and the first base station 910 may be a relationship of a macro base station-pico base station, a macro base station-femto base station, or a macro base station-macro base station.

Due to the second base station 940 or the second terminal 930, interference may occur in the first base station 910 and/or the first terminal 920. For example, if the first base station 910 and the first terminal 920 perform a downlink communication, interference occurring due to an uplink communication of the second terminal 930 or interference occurring due to a downlink communication of the second base station 940 may occur in the first terminal 920.

Such interference may be solved through an interference control between the first base station 910 and the second base station 940. For example, the interference control may include an optimal resource scheduling, a transmit power control such as a dynamic spectrum management, an interference alignment, an ITN, interference neutralization, a multi-antenna transmit, and the like. The interference control may be performed by each of the first base station 910 and the second base station 940 through coordination, and may also be performed independently by one of the first base station 910 and the second base station 940. If the first base station 910 independently performs the interference control, a result of the interference control performed by the first base station 910 may be notified to the second base station 940. The second base station 940 may operate based on the result of the interference control. For example, the first base station 910 may command the second base station 940 such that the second base station 940 or the second terminal 930 is silent in a predetermined time resource and a predetermined frequency resource.

To perform the interference control, a message exchange may need to be performed between the first base station 910 and the second base station 940. According to various aspects, the first base station 910 and the second base station 940 may exchange messages for performing the interference control via the first terminal 920. For example, the first terminal 920 may relay messages for performing the interference control between the first base station 910 and the second base station 940, thereby more efficiently supporting the interference control. For example, as described in the examples of FIGS. 1 through 8, the first terminal 920 may transfer a feedback message to the second base station 940 so that the first base station 910 and the second base station 940 may more efficiently share channel information. Hereinafter, examples in which the first terminal 920 relays messages for interference control including various information and indicators as well as channel information is further described.

Figure 10:
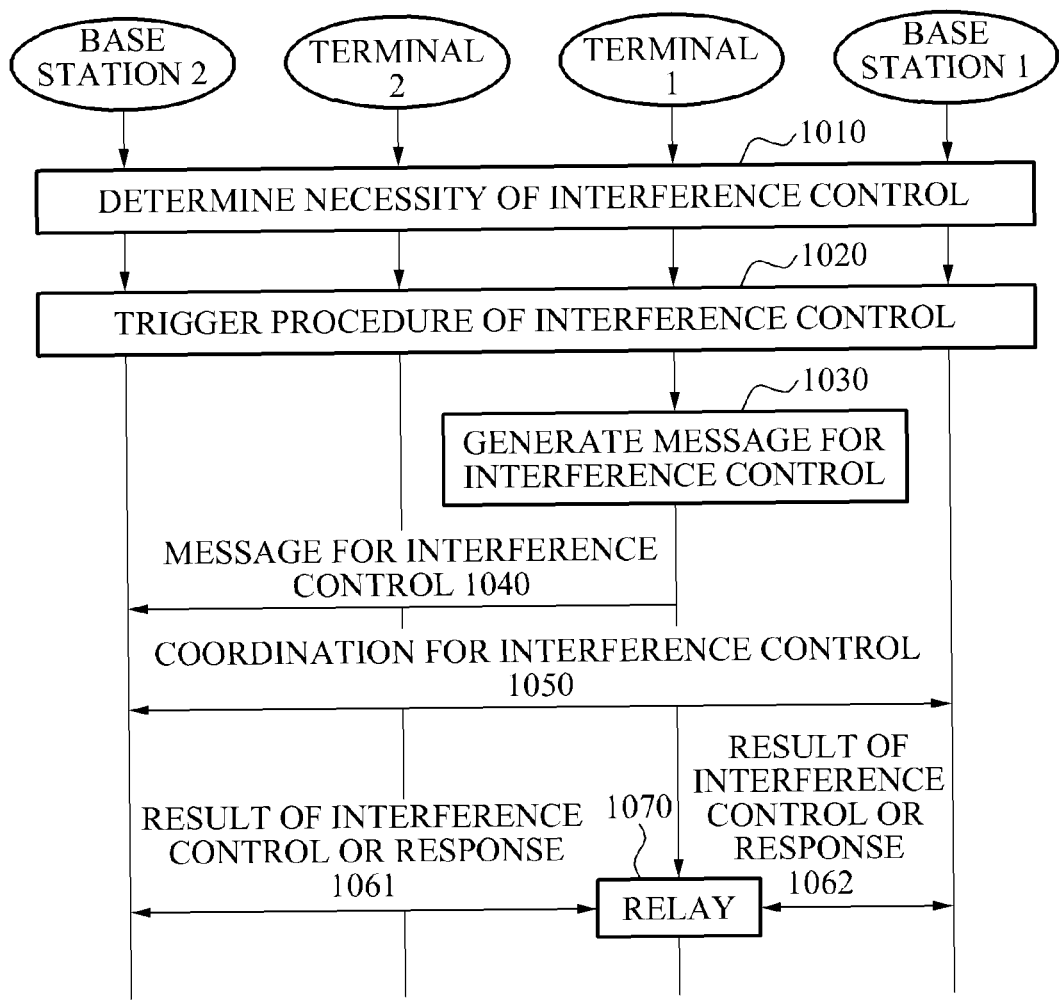
FIG. 10 is a flowchart illustrating an example of a process in which a first terminal performs relaying between a first base station and a second base station so that interference may be controlled.

FIG. 10 is a flowchart illustrating an example of a process in which a first terminal performs relaying between a first base station and a second base station so that interference control may be performed.

Referring to FIG. 10, the first terminal of FIG. 9 is referred to as a terminal 1, the second terminal is referred to as a terminal 2, the first base station is referred to as a base station 1, and the second base station is referred to as a base station 2.

In 1010, at least one of the terminal 1, the terminal 2, the base station 1, and the base station 2 determines whether there is a need to perform an interference control. Whether there is a need to perform the interference control may be determined based on a variety of criteria by at least one of the terminal 1, the terminal 2, the base station 1, and the base station 2.

For example, if interference occurs in the terminal 1 due to the base station 2 and the terminal 2, whether there is a need to perform the interference control may be determined based on channel information of the terminal 1, for example, an SINR, a PER, a BER, a received signal strength, a reference signal received power, a reference signal received quality, and the like. In this example, the terminal 1 may determine whether there is a need to perform the interference control by itself, and may provide channel information to the base station 1 or the base station 2 so that the base station 1 or the base station 2 may determine whether there is a need to perform the interference control. Whether there is a need to perform the interference control may be determined without using the channel information of the terminal 1. For example, the base station 2 may determine whether there is a need to perform the interference control in response to the recognized presence of the terminal 1 or the terminal 2.

If it is determined by a device that there is a need to perform the interference control, a procedure of the interference control is triggered in 1020. The procedure of the interference control may also be triggered by a device among the terminal 1, the terminal 2, the base station 1, and the base station 2. Messages used for the process of triggering the procedure of the interference control may be relayed to the base station 1 and the base station 2 via the terminal 1, which is further described later.

In response to the interference control being triggered, the terminal 1 generates a message for the interference control in 1030 and transmits the message to the base station 2 in 1040. For example, the message for the interference control may include a 'feedback message', described above with reference to FIGS. 1 through 8, and may also include a variety of information exchanged between the base station 1 and the base station 2 to perform the interference control.

As one example, if the base station 1 identifies a radio resource that should not be used by the base station 2 and transmits information associated with the radio resource to the terminal 1, the terminal 1 may generate information associated with the radio resource as the 'message' and transfer the 'message' to the base station 2. In this example, the base station 2 may verify an interference issue at the terminal 1 or the base station 1 based on the 'message', and may coordinate with the base station 1 to perform the interference control.

As another example, if the base station 2 triggers the procedure of the interference control by transmitting information associated with a necessity of the interference control to the terminal 1 in a form of a 'request', the terminal 1 may generate information associated with the necessity of the interference control as the message and relay the message to the base station 1. In this example, the base station 1 may transmit, to the base station 2 via the terminal 1, a message accepting the performance of the interference control. Accordingly, the interference control may be performed between the base station 1 and the base station 2. Information associated with the necessity of the interference control, the message accepting the procedure of the interference control, and the like, may be exchanged between the base station 1 and the base station 2 via the terminal 1, and may be an indicator of a predetermined bit, for example, 1 bit.

If the terminal 1 transmits messages for performing the interference control to the base station 2, the base station 1 and the base station 2 may perform coordination for the interference control in 1050. Even though the terminal 1 only transmits a single message to the base station 2 in FIG. 10, a plurality of messages may be exchanged between the base station 1 and the base station 2 via the terminal 1 in various embodiments.

In 1061, 1062, and 1070, a result of the interference control is relayed between the base station 1 and the base station 2 via the terminal 1. The result of the interference control may vary, and may include, for example, information associated with a radio resource used by the base station 2 and the terminal 2, information associated with transmit power, and the like. A command according to the result of the interference control performed by the base station 1 or the base station 2, may be relayed via the terminal 1. A response to the command may also be relayed.

Figure 11:
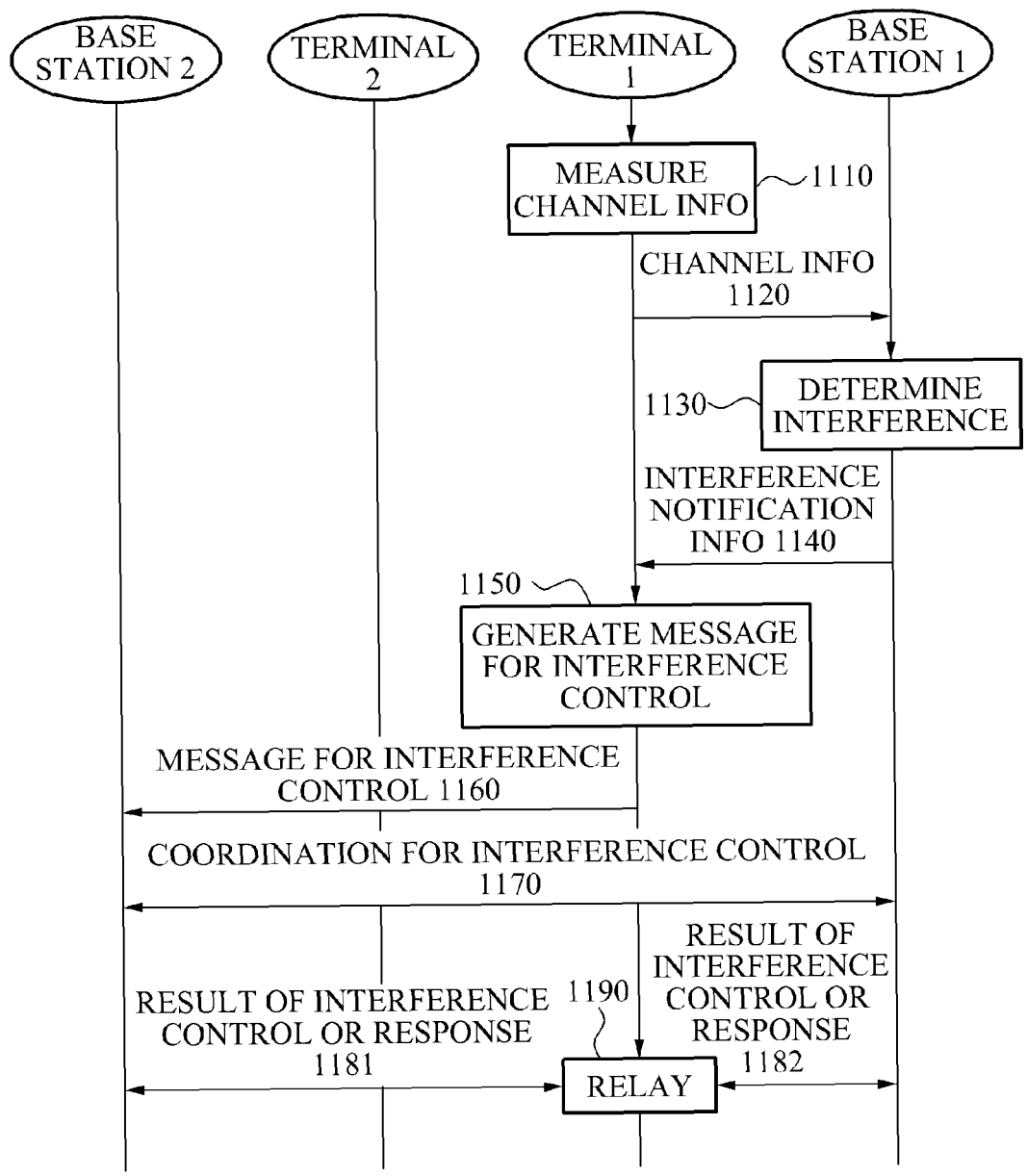
FIG. 11 is a flowchart illustrating another example of a process in which a first terminal performs relaying between a first base station and a second base station so that interference may be controlled, in response to the first base station triggering the interference control based on interference in the first terminal.

FIG. 11 is a flowchart illustrating an example of a process in which a terminal 1 performs relaying between a base station 1 and a base station 2 so that interference control may be performed, in response to the base station 1 triggering the interference control based on interference in the terminal 1.

Referring to FIG. 11, in 1110, terminal 1 measures channel information of the terminal 1, for example, an SINR with respect to a signal received from the base station 1, a PER, a BER, a received signal strength, a reference signal received power, a reference signal received quality, and the like. For example, channel information of the terminal 1 may indicate interference occurring in the terminal 1 due to the base station 2 or the terminal 2.

In 1120, the terminal 1 feeds back the channel information to the base station 1. In 1130, the base station 1 determines whether an amount of interference in the terminal 1 is greater than a threshold based on the channel information. If the amount of interference in the terminal 1 is greater than the threshold, the base station 1 transmits, to the terminal 1, information, for example, interference notification information indicating that the interference is occurring in the terminal 1, in 1140. As an example, the interference notification information may be provided to the terminal 1 in a form of an indicator of a predetermined bit or in a form of a request. Also, the interference notification information may include information associated with a radio resource that should not be used by the base station 2.

If the terminal 1 receives information indicating that the interference is occurring in the terminal 1, the terminal 1 generates a message for performing the interference control, in 1150. For example, the terminal 1 may generate a message including information associated with the radio resource that should not be used by the base station 2, a request of the base station 1 that desires to perform the interference control, and the like.

In 1160, the terminal 1 modifies information indicating that the interference is occurring, as the message for performing the interference control. In 1170, the base station 1 and the base station 2 perform coordination for the interference control.

In 1181, 1182, and 1190, a result of the interference control is relayed between the base station 1 and the base station 2 via the terminal 1. The result of the interference control may vary, and may include, for example, information associated with a radio resource used by the base station 2 and the terminal 2, information associated with transmit power, and the like. A command according to the result of the interference control performed by the base station 1 or the base station 2 may also be relayed via the terminal 1. In addition, a response to the command may also be relayed.

Figure 12:
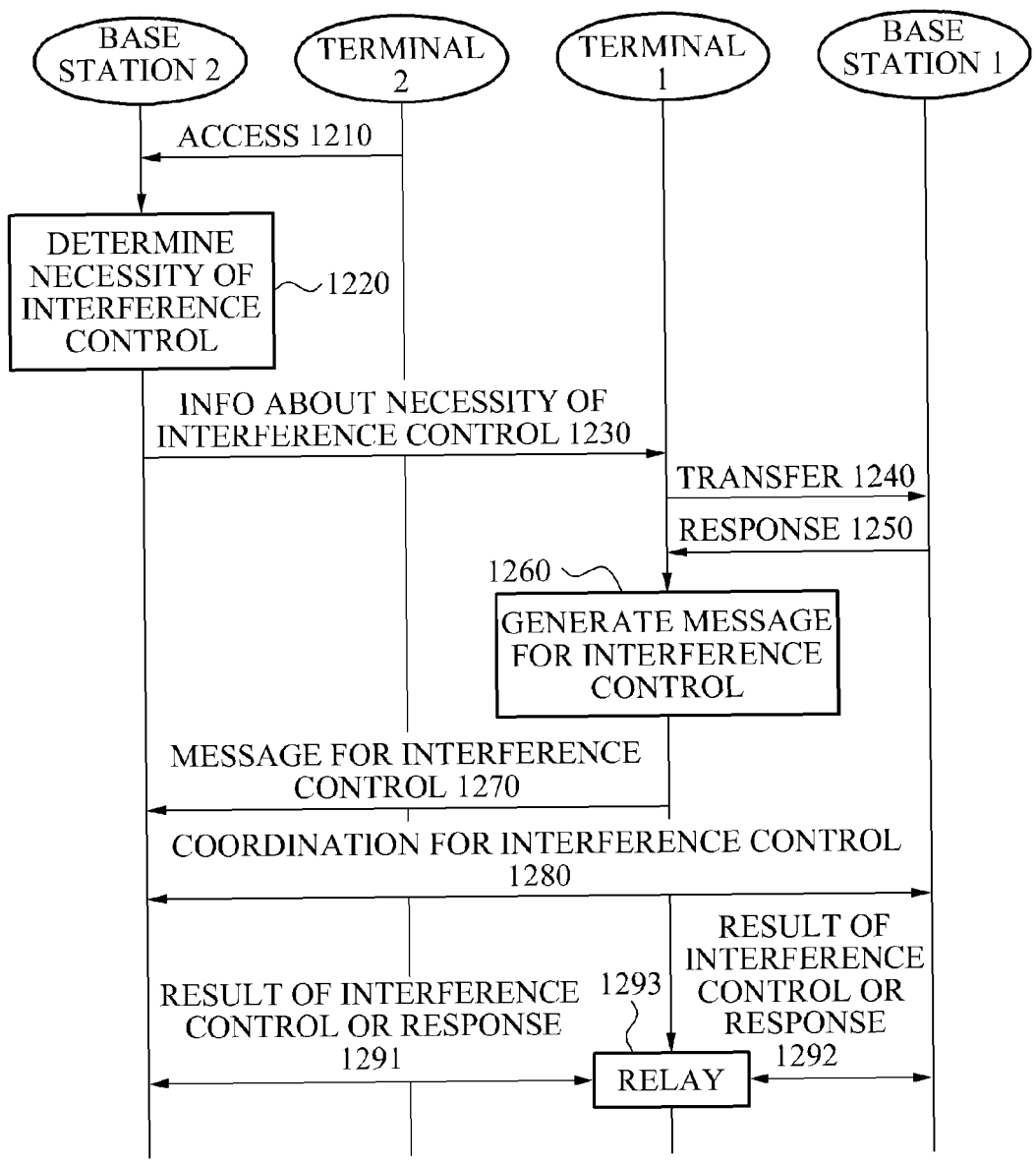
FIG. 12 is a flowchart illustrating another example of a process in which a first terminal performs relaying between a first base station and a second base station so that interference may be controlled, in response to the second base station triggering the interference control.

FIG. 12 is a flowchart illustrating an example of a process in which a terminal 1 performs relaying between a base station 1 and a base station 2 so that interference control may be performed, in response to the base station 2 triggering the interference control.

Referring to FIG. 12, in 1210, the terminal 2 accesses the base station 2. In 1220, in response to the access of the terminal 2, the base station 2 determines a necessity of an interference control. For example, the base station 2 may determine the necessity of the interference control by predicting interference occurring in the terminal 1 or the base station 1 due to communication between the base station 2 and the terminal 2, based on a relative position of the terminal 1 or the base station 1 and the like.

If it is determined that interference control is to be performed, the base station 2 transmits information associated with the need to perform the interference control to the terminal 1, in 1230. Information associated with the necessity of the interference control may be a request for performing a procedure of the interference control.

In 1240, the terminal 1 transfers information associated with the necessity of the interference control to the base station 1. In 1250, the terminal 1 receives a response to the information from the base station 1. For example, the response may relate to the request. The terminal 1 generates a message for performing the interference control based on the response, in 1260, and transfers the message to the base station 2, in 1270.

In response to the base station 2 receiving the message transferred from the terminal 1, the base station 1 and the base station 2 perform coordination for the interference control, in 1280.

In 1291, 1292, and 1293, a result of the interference control is relayed between the base station 1 and the base station 2 via the terminal 1. The result of the interference control may vary, and may include, for example, information associated with a radio resource used by the base station 2 and the terminal 2, information associated with transmit power, and the like. A command according to the result of the interference control performed by the base station 1 or the base station 2 may also be relayed via the terminal 1. In addition, a response to the command may also be relayed.

Figure 13:
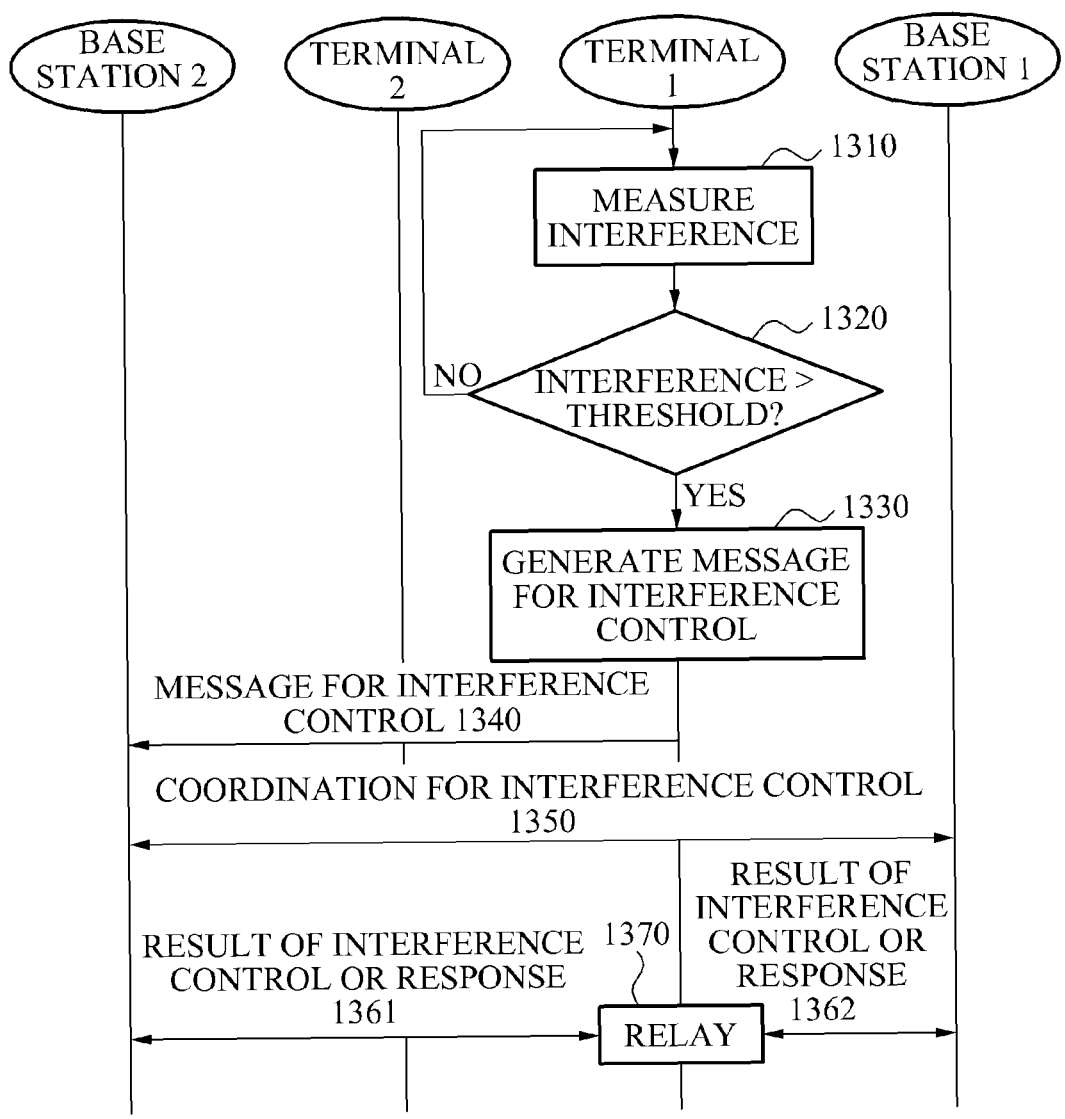
FIG. 13 is a flowchart illustrating an example of a process in which a first terminal performs relaying between a first base station and a second base station so that interference may be controlled, in response to the first terminal triggering the interference control.

FIG. 13 is a flowchart illustrating an example of a process in which a terminal 1 performs relaying between a base station 1 and a base station 2 so that interference control may be performed, in response to the terminal 1 triggering the interference control.

Referring to FIG. 13, in 1310, the terminal 1 measures interference based on channel information, for example, an SINR, a PER, a BER, a received signal strength, a reference signal received power, a reference signal received quality, and the like. In 1320, the terminal 1 compares an amount of interference with a threshold. If the amount of interference is greater than the threshold, the terminal 1 generates a message for an interference control, in 1330. The message for the interference control may include a message for triggering a procedure of the interference control. In 1340, the terminal 1 transmits the message for the interference control to the base station 2.

If the base station 2 receives the message transferred from the terminal 1, the base station 1 and the base station 2 perform coordination for the interference control, in 1350.

In 1361, 1362, and 1370, a result of the interference control is relayed between the base station 1 and the base station 2 via the terminal 1. The result of the interference control may vary, and may include, for example, information associated with a radio resource used by the base station 2 and the terminal 2, information associated with transmit power, and the like. A command according to the result of the interference control performed by the base station 1 or the base station 2 may also be relayed via the terminal 1. In addition, a response to the command may also be relayed.

Hereinafter, a case in which interference occurs in the first base station 910 is described again with reference to FIG. 9. Referring to FIG. 9, due to an uplink communication of the second terminal 930 or a downlink communication of the second base station 940, interference from the second terminal 930 or interference from the second base station 940 may occur in the first base station 910.

If the interference occurs in the first base station 910, the first base station 910 may measure the interference and may determine whether there is a need to perform an interference control. If there is a need to perform the interference control, the first base station 910 may request the first terminal 910 to generate a message for performing the interference control, and to transfer the message to the second base station 940.

As one example, the first base station 910 may request the first terminal 920 to transfer a message for triggering a procedure of the interference control to the second base station 940. In response to the request of the first base station 910, the first terminal 920 may transfer the message for triggering the procedure of the interference control to the second base station 940. In this example, the second base station 940 may transfer a response to the message for triggering the procedure of the interference control to the first base station 910 via the first terminal 920.

As another example, the first base station 910 may transmit information associated with a result of the interference control to the second base station 940, via the first terminal 920. The interference control may be performed by each of the first base station 910 and the second base station 940 through coordination, or may be independently performed by the first base station 910.

Examples in which the terminal 1 relays messages between the base station 1 and the base station 2 are described above with reference to FIGS. 9 through 13. Description related to the feedback message made above with reference to FIGS. 1 through 8 may also be applied to the examples of FIGS. 9 through 13.

For example, the terminal 1 may generate the feedback message as a message for performing an interference control. The base station 2 may verify channel information between the base station 1 and the terminal 1 and channel information between the base station 2 and the terminal 1. In addition, the terminal 1 may transmit the message to the base station 2 using a common shared channel or a random access channel.

The terminal 1 may generate the message by combining channel information between the base station 1 and the terminal 1 with a well-known signal, and may process channel information between the base station 1 and the terminal 1 as a predetermined reference signal.

Figure 14:
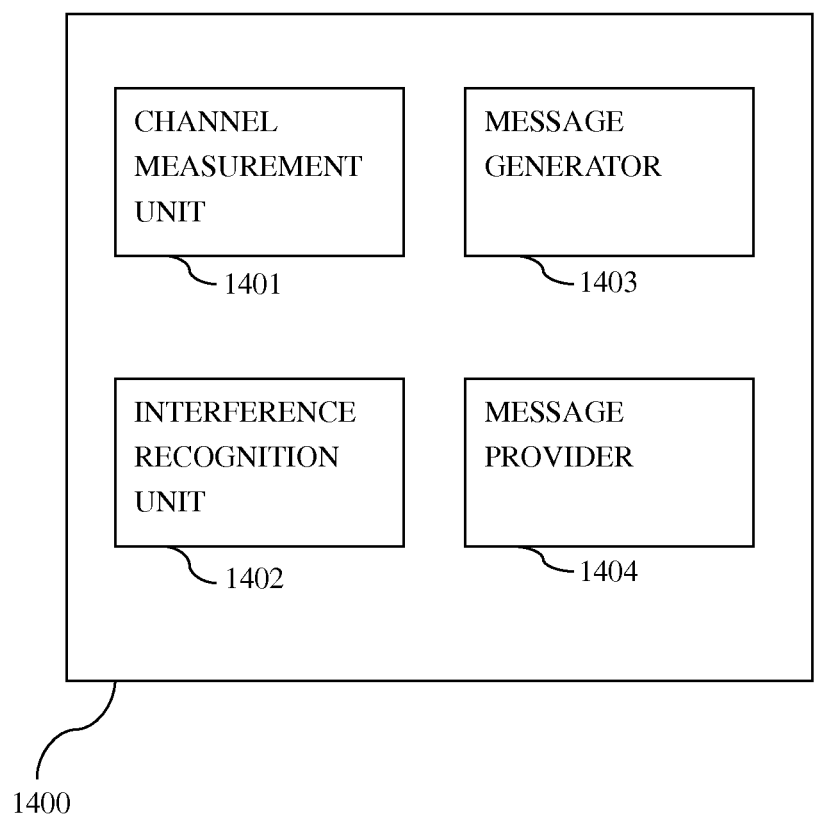
FIG. 14 is a diagram illustrating an example of a terminal.

FIG. 14 illustrates an example of a terminal

Referring to FIG. 14, a terminal 1400 being served by a serving base station includes a channel measurement unit 1401, an interference recognition unit 1402, a message generator 1403, and a message provider 1404.

The channel measurement unit 1401 may periodically or aperiodically measure channel information between the serving base station and the terminal 1400.

The interference recognition unit 1402 may recognize interference caused by a neighboring base station. For example, the interference recognition unit 1402 may recognize the interference caused by the neighboring base station, based on various factors, for example, an SINR, a PER, a BER, a received signal strength, a reference signal received power, a reference signal received quality, and the like. The interference recognition unit 1402 may also recognize the interference caused by the neighboring base station, according to reporting from the serving base station about the occurrence of the interference.

The message generator 1403 may generate the feedback message that is used by the neighboring base station to verify channel information between the serving base station and the terminal 1400, and channel information between the neighboring base station and the terminal 1400. For example, the message generator 1403 may generate the feedback message by combining a well-known signal and channel information between the serving base station and the terminal 1400, or may generate the feedback message by processing channel information between the serving base station and the terminal 1400 to a reference signal.

The message provider 1404 may provide the feedback message to the neighboring base station. For example, the message provider 1404 may transmit the feedback message using a common shared channel or a random access channel. The to terminal 1400 may also include a receiver to receive data from a base station such as a serving base station and a neighboring base station.

Examples of FIGS. 1-13 are also applicable to the terminal 1400 described in the example of FIG. 14.

According to various aspects, it is possible to effectively overcome adverse effects resulting from interference occurring between two cells, for example, a macro cell and a femtocell.

According to various aspects, a terminal may relay messages between two base stations that perform an interference control, thereby providing a solution to a message exchanging process using the interference control.

According to various aspects, base stations may obtain information used to more effectively perform an interference control using a feedback message.

According to various aspects, different cells may share channel information using a common shared channel or a random access channel.

According to various aspects, it is possible to more effectively recognize interference based on a packet error rate, a bit error rate, a signal-to-interference plus noise ratio (SINR), a received signal strength, a reference signal received power, a reference signal received quality, and the like.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. A communication method of a first terminal served by a first base station, the communication method comprising:
   generating, by the first terminal served by the first base station, a message for controlling interference caused by a second base station adjacent to the first base station and/or interference caused by a second terminal served by the second base station; and
   transmitting, by the first terminal, the message to the second base station so that the second base station controls the interference, or so that the first base station and the second base station cooperate to control the interference,
   wherein the message to the second base station includes first channel information between the first base station and the first terminal generated from an initial message transmitted from the first base station to the first terminal,
   wherein the second base station estimates second channel information between the second base station and the first terminal based upon the message to the second base station, and
   wherein the second base station cooperates to control the interference based upon the first channel information and the second channel information.

2. The communication method of claim 1, further comprising:
   transmitting channel information of the first terminal to the first base station; and
   receiving, by the first terminal from the first base station, information indicating that interference is occurring in the first terminal,
   wherein the generating comprises generating the message, in response to the received information indicating that the interference is occurring in the first terminal.

3. The communication method of claim 1, further comprising:
   relaying a result of the interference control or a response to the message between the first base station and the second base station.

4. The communication method of claim 1, further comprising:
   receiving, by the first terminal from the second base station, a request for the interference control; and
   transmitting, by the first terminal, the request for the interference control to the first base station,
   wherein the generating comprises generating the message, in response to a response to the request for the interference control being received from the first base station.

5. The communication method of claim 1, further comprising:
   measuring the interference from the second base station to the first terminal and/or the interference from the second terminal to the first terminal, based on channel information of the first terminal,
   wherein the generating comprises generating the message, in response to the measured interference from the second base station to the first terminal and/or the measured interference from the second terminal to the first terminal.

6. The communication method of claim 1, wherein the first base station is a macro base station in a cellular communication system, and the second base station is a smaller base station that comprises a femto base station or a pico base station.

7. The communication method of claim 1, wherein the message is used by the second base station verify channel information between the first base station and the first terminal, and estimate channel information between the second base station and the first terminal.

8. The communication method of claim 1, wherein the transmitting comprises transmitting the message to the second base station using a common shared channel or a random access channel.

9. The communication method of claim 1, wherein the message comprises the channel information between the first base station and the first terminal and a preamble or pilot signal.

10. The communication method of claim 1, wherein the message comprises a reference signal that is generated by processing channel information between the first base station and the first terminal.

11. The communication method of claim 1, further comprising:
    recognizing the interference from the second base station to the first terminal and/or the interference from the second terminal to the first terminal,
    wherein the generating comprises generating the message, in response to the recognized interference from the second base station to the first terminal and/or the recognized interference from the second terminal to the first terminal.

12. The communication method of claim 11, wherein the recognizing of the interference from the second base station to the first terminal and/or the interference from the second terminal to the first terminal comprises:
    recognizing the interference from the second base station to the first terminal and/or the interference from the second terminal to the first terminal, based on at least one of a signal-to-interference plus noise ratio with respect to a signal received from the first base station, a packet error rate, a bit error rate, a received signal strength, a reference signal received power, and a reference signal received quality.

13. The communication method of claim 11, further comprising:
comparing the interference from the second base station to the first terminal and/or the interference from the second terminal to the first terminal to a predetermined level.

14. The communication method of claim 1, wherein the first base station, the first terminal, and the second base station operate using a time division duple (TDD) scheme.

15. A communication method of a second base station that serves a second terminal and is adjacent to a first base station serving a first terminal, the communication method comprising:
receiving, by the second base station that serves the second terminal from the first terminal, a message for controlling interference with respect to interference from the second base station to the first terminal and/or interference from the second terminal to the first terminal;
determining whether the interference is to be controlled based on the message; and
controlling the interference based on a result of the determination,
wherein the message to the second base station includes first channel information between the first base station and the first terminal generated from an initial message transmitted from the base station to the first terminal,
wherein the second base station estimates second channel information between the second base station and the first terminal based upon the message to the second base station, and
wherein the second base station cooperates to control the interference based upon the first channel information and the second channel information.

16. The communication method of claim 15, further comprising:
transmitting a request for the interference control to the first terminal, in response to the interference from the second base station to the first terminal and/or the interference from the second terminal to the first terminal being predicted to occur,
wherein the receiving comprises receiving the message from the first terminal after transmitting the request for the interference control to the first terminal.

17. The communication method of claim 15, wherein:
the determining comprises verifying a requirement of the first base station in relation to the interference control, based on the message; and
the controlling comprises controlling the interference based on the requirement of the first base station in relation to the interference control.

18. The communication method of claim 15, further comprising:
verifying the channel information between the first base station and the first terminal, and estimating the channel information between the second base station and the first terminal, based on the message,
wherein the controlling comprises controlling the interference based on the channel information between the first base station and the first terminal and the channel information between the second base station and the first terminal.

19. The communication method of claim 15, wherein the receiving comprises receiving the message from the first terminal using a common shared channel or a random access channel.

20. The communication method of claim 15, wherein the message comprises a reference signal that is generated by processing the channel information between the first base station and the first terminal.

21. A communication method of a first base station in a multi-cell communication system comprising the first base station serving a first terminal and a second base station serving a second terminal, the communication method comprising:
measuring interference from the second terminal to the first base station and/or interference from the second base station to the first base station; and
requesting the first terminal to generate a message for controlling interference, and to transfer the message to the second base station,
wherein the message to the second base station includes first channel information between the first base station and the first terminal generated from an initial message transmitted from the first base station to the first terminal,
wherein the second base station estimates second channel information between the second base station and the first terminal based upon the message to the second base station, and
wherein the second base station cooperates to control the interference based upon the first channel information and the second channel information.

22. The communication method of claim 21, further comprising:
independently controlling the interference or cooperatively controlling the interference through coordination with the second base station, with respect to the interference from the first terminal to the first base station and/or the interference from the second base station to the first base station.

23. The communication method of claim 21, further comprising:
receiving a response to the message from the second base station via the first terminal, or transmitting a result of the interference control to the second base station via the first terminal.

24. A terminal served by a serving base station, the terminal comprising:
a message generator processor configured to generate a message that comprises information for controlling interference caused by a neighboring base station adjacent to the serving base station and/or interference caused by another terminal served by the neighboring base station; and
a transmitter configured to transmit the message to the neighboring base station,
wherein the message to the neighboring base station includes first channel information between the serving base station and the terminal generated from an initial message transmitted from the serving base station to the terminal,
wherein the neighboring base station estimates second channel information between the neighboring base station and the terminal based upon the message to the neighboring base station, and
wherein the neighboring base station cooperates to control the interference based upon the first channel information and the second channel information.

25. The terminal of claim 24, further comprising:
a channel measurement processor configured to measure the channel information between the serving base station and the terminal,
wherein the transmitter is configured to transmit the channel information between the serving base station and the terminal to the serving base station.

26. The terminal of claim 25, further comprising:
a receiver configured to receive, from the serving base station, information indicating that interference is occurring in the terminal,
wherein the message generator processor is configured to generate the message, in response to the received information indicating that interference is occurring in the terminal.

\* \* \* \* \*